June 29, 1943.  F. W. MEREDITH  2,323,151
AUTOMATIC STEERING CONTROL FOR AIRCRAFT
Filed July 7, 1939  2 Sheets-Sheet 1
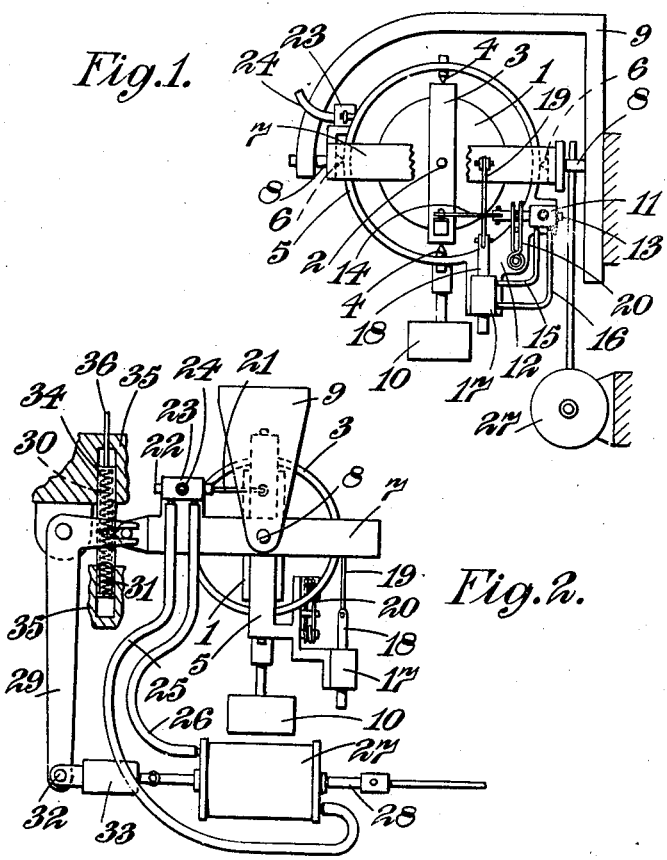
Frederick W. Meredith
By
Watson, Cole, Grindle & Watson
Attys.

June 29, 1943.  F. W. MEREDITH  2,323,151
AUTOMATIC STEERING CONTROL FOR AIRCRAFT
Filed July 7, 1939  2 Sheets-Sheet 2
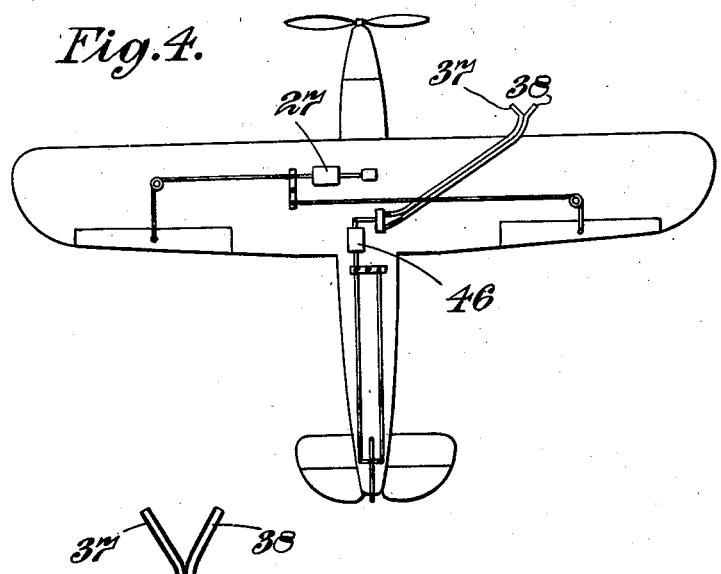
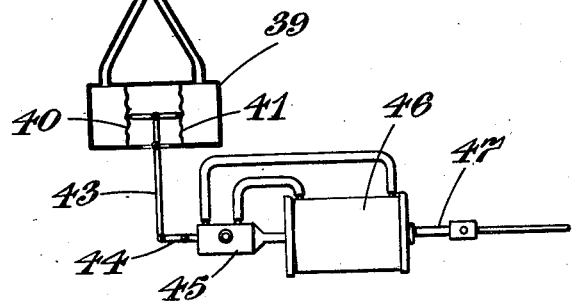
Frederick W. Meredith
By
Watson, Cole, Grindle & Watson
Attys.

UNITED STATES PATENT OFFICE 2,323,151

AUTOMATIC STEERING CONTROL FOR AIRCRAFT

Frederick William Meredith, London, England, assignor to S. Smith & Sons (Motor Accessories) Limited, London, England, a British company Application July 7, 1939, Serial No. 283,315
In Great Britain July 13, 1938

6 Claims. (Cl. 244—79)

This invention relates to automatic steering control of aerodynes. Hitherto, it has always been considered necessary to provide a device, such as a directional gyroscope, responsive to turning of the craft in azimuth (i. e. rotation about a vertical axis) and to exert a control in accordance with the responsse of the device to such turning. Thus, in the usual system of automatic steering control the rudder is actuated in accordance with the deviations of a directional gyroscope to maintatin the aerodyne on a desired course.

The object of the present invention is to abolish the necessity for such devices and so simplify the automatic control system.

The invention is based on the fact that an aerodyne cannot turn in azimuth, and therefore cannot change its course relatively to the air, without either banking or side-slipping, and therefore, if side-slipping is prevented a craft will be on its course so long as the time integral of the angle of bank (i. e. the rate of change in deviation about a longitudinal axis) is made zero.

According to the present invention there is provided an aerodyne having rolling controllers such as ailerons, wherein steering or course stabilisation is effected by automatically operating the rolling controllers in accordance with the time integral of the angle of bank of the aerodyne.

We have found that with this steering control the aerodyne oscillates about its course and some means for advancing the phase of the movements of the rolling controllers has to be employed to provide damping. According to a further feature of the invention one means of providing this damping consists in automatically operating the rolling controllers in accordance with the angle of bank.

Side-slip may be avoided without operation of the rudder by the inherent stability of the aircraft provided the rudder is suitably trimmed, or it may be prevented by manual operation of the rudder, or again, according to a further feature of the invention, the rudder is automatically controlled by means for detecting lateral acceleration or side-slip, to adjust the rudder to reduce the lateral acceleration or side-slip.

In one construction of apparatus according to the invention the means controlling the ailerons comprises a gyroscope having a rotor with a transverse spinning axis, a servomotor controlled by the gyroscope, a follow-up member biased to it normal central position by spring means, and a viscous link between the servomotor and the follow-up frame.

One specific arrangement according to the invention is illustrated diagrammatically and by way of example in the accompanying drawings, in which:

Figures 1 and 2 are views at right-angles of a gyroscopic control apparatus for ailerons, Figure 3 shows rudder control means for opposing side-slip, and Figure 4 shows an aeroplane provided with the control apparatus shown in Figures 1, 2 and 3.

Referring to Figures 1 and 2, the gyroscope comprises a rotor 1 whose axis of spin 2 is horizontal and lies athwartship of the aerodyne. The rotor is carried in an inner vertical gimbal ring 3, the plane of which also lies athwartship. The inner gimbal ring 3 is mounted by vertical pivots 4 in an outer gimbal ring 5, the plane of which is normally orthogonal to the inner gimbal ring 3 and also vertical. The outer gimbal ring 5 is carried by horizontal fore-and-aft pivots 6 about the roll axis of the aerodyne in a follow-up frame 7, which is mounted on plain bearings 8 (also on the roll axis) on a main casting or base plate 9, which is fast on the aerodyne.

Rigidly attached to the outer gimbal ring 5 and carried beneath it is a weight 10, so that the centre of gravity of the gyroscope system lies below the fore-and-aft axis of suspension 6 of the outer gimbal ring. The function of the weight in conjunction with other parts hereinafter described is to enable the gyroscope to define a horizontal line in the manner which will be explained.

A piston valve 13 in a valve cylinder 11, which is attached to an extension 12 of the outer gimbal ring 5, is sensitive to and serves to detect relative movement between the inner and outer gimbal rings. The piston valve 13 is connected by a link 14 to the inner gimbal ring 3, and relative movement between the inner and outer gimbal rings causes the piston valve 13 to admit compressed air through one or other of the conduits 15 and 16 to a precessing motor 17.

The precessing motor 17, which is mounted on the extension 12 of the outer gimbal ring 5 contains a precessing piston 18, which is connected by a link 19 to the follow-up frame 7. The precessing piston 18 is so arranged as to be capable of applying a torque about the outer gimbal ring fore-and-aft axis 6 between the outer gimbal ring and the follow-up frame 7. This torque is controlled both in magnitude and sign by the operation of the piston valve 13.

A bifurcated spring 20 mounted on the extension 12 of the outer gimbal ring 5 engages an abutment on the piston valve 13, and is adapted to apply a restoring torque reaction between the gimbal rings when the inner gimbal ring is displaced from its normal orthogonal position relative to the outer gimbal ring.

By means of the mechanism above described, the outer gimbal ring 5 is maintained in the vertical plane in a manner which will be described later.

The gyroscope system is used to control the ailerons of the aerodyne by connecting the outer gimbal ring 5 by means of a link 21 to a piston valve 22 operating in a valve cylinder 23 rigidly attached to the follow-up frame 7. Relative movement between the piston valve 22 and the valve cylinder 23 causes compressed air, which is supplied to the valve cylinder through a flexible conduit 24, to be admitted through one or other of two flexible conduits 25 and 26 to the appropriate end of a servomotor cylinder 27, which is fast on the aircraft and contains a double-action piston. The servomotor piston rod 28 is connected in any suitable manner to the ailerons as shown in Figure 4. In the operation of the arrangement, relative movement about the fore-and-aft axis 6 between the aerodyne and the gyroscope system causes the valve 22 to admit compressed air to one end or the other of the servomotor cylinder so as to apply correcting movements to the aerodyne to control rolling movements of the aircraft. In order to obtain a follow-up effect in which the movements of the ailerons are quantitively controlled by the displacement of the outer gimbal ring relative to the aerodyne, the servomotor piston rod 28 is connected, through a link 33 which will be described later, to a cranked lever 29, which is fulcrumed on the aerodyne, and in turn connected to the follow-up frame 7 in such a way that the movement of the piston rod 28 produces a rotation of the follow-up frame about its fore-and-aft bearings 8.

Considering the use of the mechanism above described during straight unaccelerated flight, let it be supposed that the pendulously weighted outer gimbal ring 5 is displaced from the vertical plane. The pendulous weight 10 will then produce a gravity torque about the outer gimbal ring fore-and-aft axis 6, and this torque will cause the gyro-rotor together with the inner gimbal ring to precess in azimuth.

Precession of the inner gimbal ring 3 in azimuth relative to the outer gimbal ring 5 operates the piston valve 13 and thereby causes the precessing piston 18 to apply a torque reaction between the follow-up frame 7 and the outer gimbal ring 5 in such a sense as to oppose the gravity torque due to the pendulous weight 10. The relative azimuthal precession of the inner gimbal ring 3 is thus limited to that small angle for which the displacement of the valve parts 11 and 13 suffices to cause the precessing piston 18 to apply the appropriate reaction as described above.

In addition to the sequence of operations described in the preceding paragraph, the precession of the inner gimbal ring 3 in azimuth causes the spring mechanism 20 to apply a small restoring torque about the vertical axis 4 of the inner gimbal ring. This torque produces a precession of the outer gimbal ring 5 about its fore-and-aft axis 6, thus returning the outer gimbal ring and the pendulous weight back to the vertical plane. Thus, if the outer gimbal ring is displaced in either direction it will subside gradually to the vertical plane.

Considering the forces acting on the pendulous weight 10 during steady curved flight, it is seen that in addition to the gravitational force, there is also a centrifugal force which exerts a torque about the outer gimbal ring fore-and-aft axis 6. This torque, which is proportional to the forward speed and rate of turn of the aircraft, causes a precession of the gyro-rotor 1 and the inner gimbal ring 3 in azimuth.

The relationship between the moment of the weight, the angular momentum of the gyro-rotor and the forward speed of the aircraft may, therefore, be suitably chosen so that the rate of precession of the inner gimbal ring 3 due to centrifugal force on the weight 10 will be equal to the rate of turn of the aerodyne, and, as a result, no relative displacement will occur. Thus, if the outer gimbal ring 5 lies in the vertical plane, it will not be displaced from that plane by the action of centrifugal force during a turn.

The mechanism thus far described is in accordance with United States Patent No. 1,992,086 and will maintain the aerodyne approximately horizontal about the fore-and-aft axis during straight or curved flight.

For the purpose of the present invention the follow-up frame is biased to its normal central position by means of springs 30 and 31 and is connected to one arm of a cranked lever 29 fulcrumed on the aircraft. The other arm of the lever 29 is connected at 32 through a viscous link 33 to the piston rod 28 of the servomotor, the link being capable of changing its length under the action of the springs 30 and 31. The springs 30 and 31 which bear at their inner ends on the follow-up frame 7, are housed in a slide 34 movable in a bracket 35 fixed on the housing, and steering of the aircraft is effected by movement of the slide 34 by means of a control rod 36 to displace the follow-up mechanism to impose the required angle of bank. Other means for displacing the follow-up mechanism for this purpose may, however, be employed. By these means the piston of the servomotor, and therefore the ailerons, are displaced by an amount equal to $a\phi + b\int\phi dt$, where $a$ and $b$ are constants, $\phi$ is the angle of bank, and $\int\theta dt$ is the rate of change of angle of bank.

In order to prevent side-slip, the rudder is controlled by means for detecting lateral acceleration or side-slip of the aerodyne. Referring to Figure 3, two Pitot heads 37 and 38, both disposed out of the slip stream of the propeller, are inclined respectively to the right and left of the centre line of the aerodyne, and are connected to different compartments of a chamber 39 formed by flexible diaphragms 40 and 41 spaced apart in the chamber, the space between the diaphragms being open to atmosphere. The diaphragms are connected by a link 42 which is coupled by a lever 43 to a piston valve 44 moving in a valve cylinder 45 and controlling a supply of compressed air to the appropriate end of a servomotor cylinder 46. The servomotor piston rod 47 is connected in any suitable manner to the rudder of the aircraft, as shown in Figure 4, and follow-up is provided by connecting the piston rod directly to the valve cylinder 45. Thus, should side-slip occur, a difference in pressure is created at the Pitot heads 37 and 38, which produces control of the rudder which is arranged in the appropriate sense to oppose the side-slip. Instead of the Pitot heads 37 and 38, other means, such as a pendulum, may be employed to detect lateral acceleration or side-slip and control the rudder accordingly.

I claim:

1. A control for an aerodyne having a lateral controller such as a rudder and rolling controllers such as ailerons, comprising detecting means for lateral acceleration or side-slip, means controlled by said detecting means automatically to adjust the lateral controller to reduct lateral acceleration or side-slip; a gyroscope having a rotor with a transverse spinning axis, a servomotor controlled by said gyroscope and actuating said rolling controllers, a follow-up member for said gyroscope, spring means biasing said follow-up member to a normal datum position, and a viscous link connecting said servomotor to said follow-up member, whereby said rolling controllers are actuated according to the angle of bank of the aerodyne and in accordance with the time integral of the angle of bank to stabilize the aerodyne in roll and maintain course.

2. In an aerodyne having rolling controllers, such as ailerons, an automatic course maintaining apparatus comprising means responding in proportion to the angle of bank of the aerodyne and means movable in proportion to the time integral of the angle of bank, means for operating said rolling controllers, connections between said last named means and said first two means for controlling the last named means by movements of both of said first two means, whereby the aerodyne is maintained on course entirely by said course maintaining apparatus.

3. In an aerodyne having rolling controllers, such as ailerons, and a rudder, a single automatic course maintaining apparatus comprising means responding in proportion to the angle of bank of the aerodyne and means movable in proportion to the time integral of the angle of bank, means for operating said rolling controllers, connections between said last named means and said first two means for controlling the last named means by movements of both of said first two means, whereby the aerodyne is maintained on course entirely by said course maintaining apparatus as applied to said ailerons only.

4. In an aerodyne having rolling controllers, such as ailerons, a rudder, detecting means for lateral acceleration or side slip and means for automatically adjusting the rudder only, in accordance with said detecting means and in the sense to reduce lateral acceleration or side slip; an automatic course maintaining apparatus comprising means responding in proportion to the angle of bank of the aerodyne and means movable in proportion to the time integral of the angle of bank, means for operating said rolling controllers, connections between said last named means and said first two means for controlling the last named means by movements of both of said first two means, whereby the aerodyne is maintained on course entirely by said course maintaining apparatus, the side slip being eliminated as a factor in affecting either the automatic bank control or its result in maintaining course.

5. A control for an aerodyne having a lateral controller such as a rudder and rolling controllers such as ailerons, comprising a gyroscope having a rotor with a transverse spinning axis, a servomotor controlled by said gyroscope and actuating said rolling controllers, a follow-up member for said gyroscope, spring means biasing said follow-up member to a normal datum position, and a viscous link connecting said servomotor to said follow-up member, whereby said rolling controllers are actuated according to the angle of bank of the aerodyne and in accordance with the time integral of the angle of bank to stabilize the aerodyne in roll and maintain course.

6. A control for an aerodyne having a lateral controller such as a rudder and rolling controllers such as ailerons, comprising a gyroscope, a servomotor controlled by said gyroscope to actuate said rolling controllers in accordance with the angle of bank of the aerodyne, a follow-up member for said gyroscope, and means connecting said follow-up member to said servomotor whereby said rolling controllers are also actuated in accordance with the time integral of the angle of bank to stabilize the aerodyne in roll and maintain course.

FREDERICK WILLIAM MEREDITH.